F. J. GLEASON.
METHOD OF MAKING HOLLOW RUBBER ARTICLES.
APPLICATION FILED OCT. 29, 1908.
964,510.
Patented July 19, 1910.
4 SHEETS—SHEET 4.
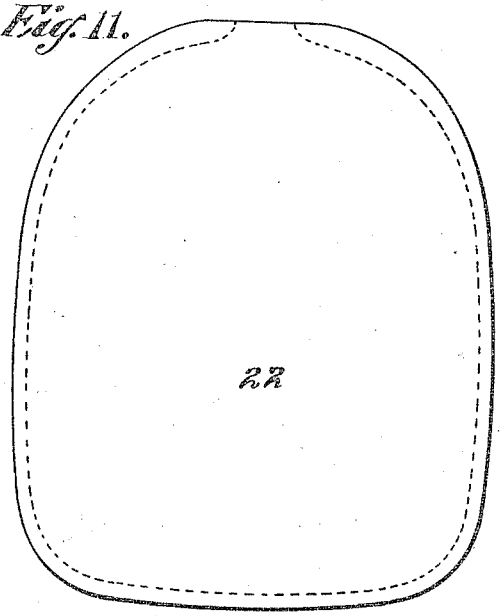
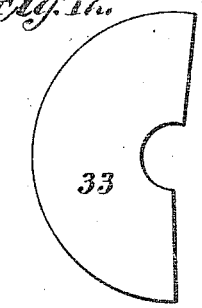
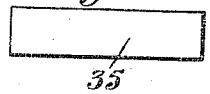
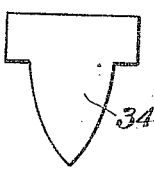
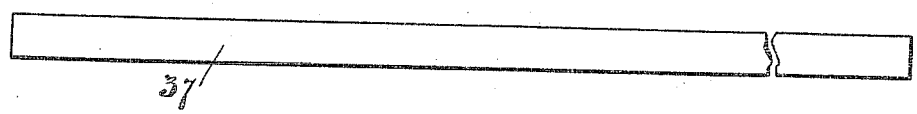
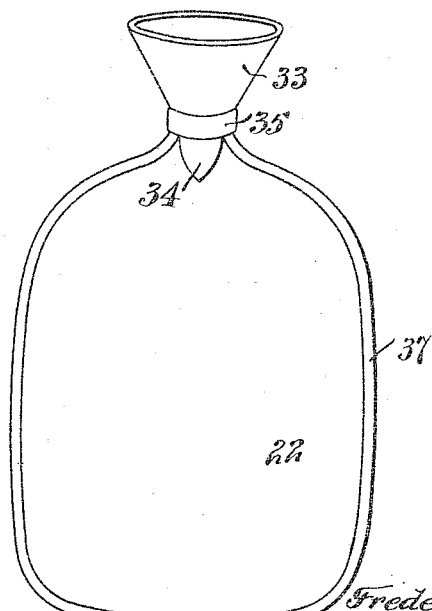
Witnesses:
F. R. Roulstone
G. E. Rust
Inventor:
Frederick J. Gleason;
by Wright Brown Quinby May
Attys.

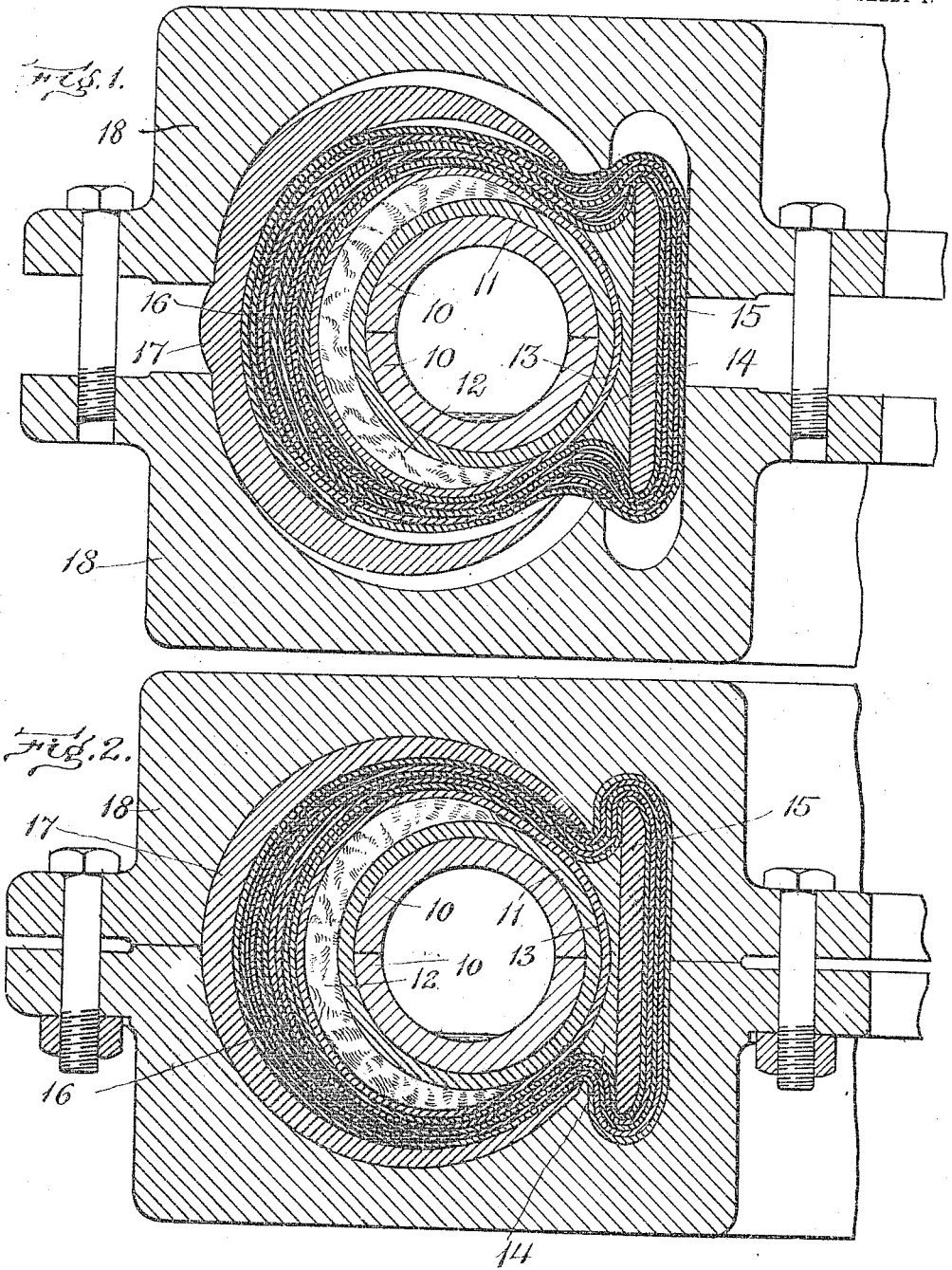

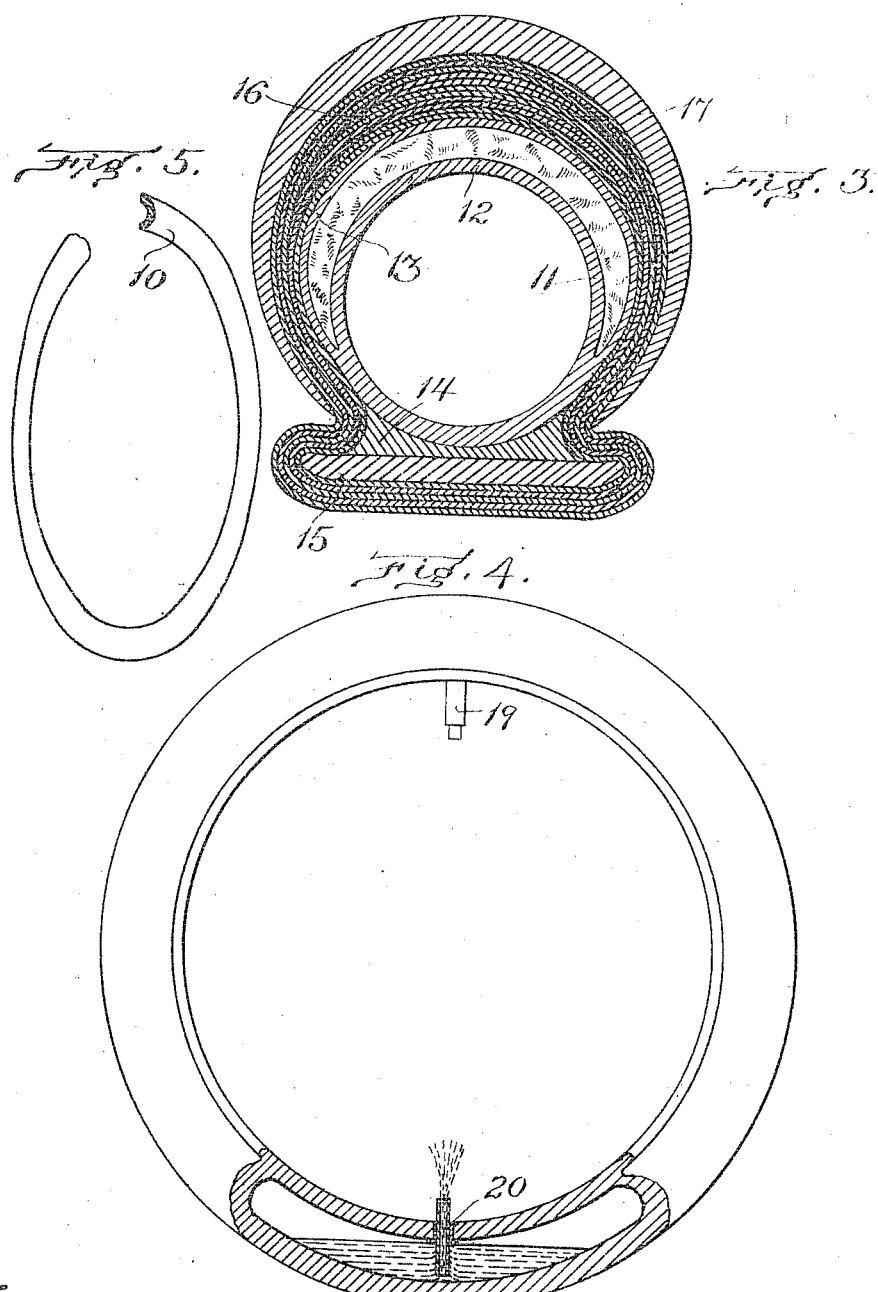

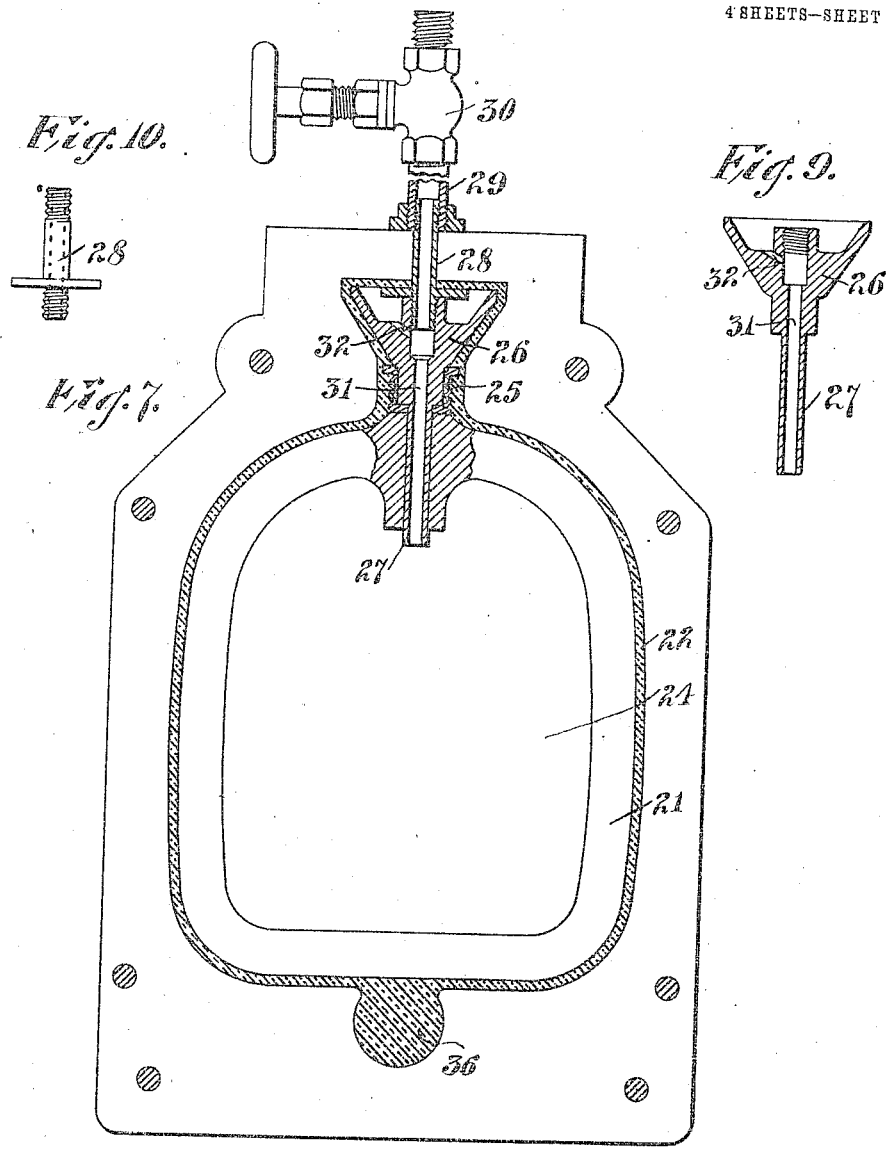

UNITED STATES PATENT OFFICE.

FREDERICK J. GLEASON, OF WALPOLE, MASSACHUSETTS, ASSIGNOR TO WALPOLE RUBBER COMPANY, OF WALPOLE, MASSACHUSETTS, A CORPORATION OF MAINE.

METHOD OF MAKING HOLLOW RUBBER ARTICLES.

964,510.  Specification of Letters Patent.  Patented July 19, 1910.

Application filed October 29, 1908. Serial No. 460,032.

*To all whom it may concern:*

Be it known that I, FREDERICK J. GLEASON, of Walpole, in the county of Norfolk and State of Massachusetts, have invented certain new and useful Improvements in Methods of Making Hollow Rubber Articles, of which the following is a specification.

This invention has relation to the manufacture of hollow seamless vulcanized rubber articles, in which the article is vulcanized about an initially rigid mandrel or core of material or substance which becomes molten at a temperature below that destructive to vulcanizable rubber.

The object of the present invention is, first, to prevent any initial adherence of the material forming the mandrel to the interior wall of the vulcanized article; second, to provide for the employment of a minimum amount of material in the construction of the mandrel; third, to provide for maintaining a pressure against the interior walls of the article when the mandrel becomes soft or molten under the influence of heat during the process of vulcanization; and, fourth, to adapt the process particularly for the manufacture of such articles as hot water bottles, fountain syringes, etc.

In carrying out the invention, the mandrel is, according to my previous Patent No. 910,370, dated January 19, 1909, made of any suitable material which will melt at a temperature below that destructive to rubber, such, for instance, as an alloy of lead, tin and bismuth. This mandrel or core is constructed in skeleton form, being either a shell which is hollow, or a frame which engages only a portion of the interior of the article which is to be vulcanized. In the manufacture of bicycle tires, for instance, I may utilize a mandrel or core which is tubular and which is formed in two complemental halves. Where an inner tube is to be manufactured, the skeleton mandrel consists of a short tube section or cylinder which is introduced inside of only the lapped ends of the tube. In the manufacture of hot-water bags and similar articles, the mandrel takes the form of a skeleton frame.

In order to sustain the pressure against the internal surface of the article in the process of vulcanization, when the mandrel grows soft, I provide for compressing air within the article after it has been formed about the mandrel and placed within the molds, and in addition thereto, I also, in some cases, place inside of the article, prior to its subjection to the vulcanizing heat, a small quantity of a suitable liquid, such as water or ammonia which will vaporize and form an expansible gas, all as will be explained in detail hereinafter.

In the manufacture of water bottles and such similar receptacles, it becomes necessary to employ a core which is in part composed of fusible material in connection with a non-fusible material, in order to build up and form the several constituent parts going to make up the receptacle. For example, in making a water bottle or such like receptacle, a fusible core may be employed to form the main portion of the receptacle and a non-fusible core to form the neck of the receptacle. In utilizing a core so constructed, the process of making the article is facilitated and rendered more effective by providing means for relieving the pressure before the article is removed from the molds.

On the accompanying drawings,—Figure 1 represents a portion of a tire as it is initially formed about the mandrel, the same being placed in a mold which is shown in cross-section. Fig. 2 represents the mold closed ready to be placed in the vulcanizing oven. Fig. 3 shows the completed tire in cross-section. Fig. 4 illustrates the removal of the molten mandrel. Fig. 5 represents in perspective view a portion of the mandrel, a part being cut away to show its shape in cross-section. Fig. 6 is a transverse section through an assembled core, and rubber portions, and the sections of a pressure mold employed in forming a rubber hot-water bag. Fig. 7 is a view of the several parts of a core assembled together in connection with the rubber parts of a receptacle in longitudinal section placed on one of the sections of a pressure mold, the core and parts being such as are used in forming a hot-water bag in accordance with this invention. Fig. 8 shows in section a spun metal nipple which is permanently left in the receptacle after it is formed to receive the stopper. Fig. 9 shows in section, a non-fusible neck core and outlet used in conjunction with the fusible core. Fig. 10 shows in section an outlet pipe having a packing flange, used in connection with the valved outlet pipe. Figs. 11 to 11c 16 show the blanks of vulcanizable rubber which may be used in making a hot-water bottle. Fig. 17 is a side elevation of a complete hot-water bottle formed in accordance with the invention.

The improved process herein set forth may be employed in the manufacture of various kinds of hollow rubber articles, and for the purpose of illustration is herein set forth as applied to the manufacture of seamless tubular articles, such as vehicle tires and hot-water bottles.

In the manufacture of vehicle tires, the mandrel may consist of two halves or sections indicated at 10 10. When placed with their edges together, they form a ring which is tubular or circular in cross-section. They are formed of any suitable material which will melt at a temperature below that destructive to rubber, such, for instance, as an alloy of lead, tin and bismuth, these metals being provided in proportions as will permit the melting of the mandrel at a temperature as may be desired from 199° F. to 250° F. or even higher. About this mandrel is formed the article to be made. In the manufacture of a vehicle tire, I first take a strip of vulcanizable rubber and coat one face thereof with a lubricant which will prevent the adherence of the molten mandrel thereto. Any suitable lubricant may be used, such for instance, as talc, starch or other substance which will not injure or cause the deterioration of the rubber or the mandrel. This strip is wound upon the mandrel as indicated at 11. Then upon the tread portion or partially encircling this layer 11 is placed a layer 12 of crude or uncured rubber which has no vulcanizing material mixed therewith, so that, during the vulcanizing process, it will remain uncured. This layer is preferably crescent shaped in cross-section, and incloses what I may term the sides and outer portion of the thus partially formed tire. A third layer, which is indicated at 13, of vulcanizable rubber is wrapped about the layers 10 and 11. Then, for the purpose of providing an attaching portion to the tire, a layer 14 of vulcanizable rubber and a flat (in cross-section) strip or layer 15 of a hard rubber composition is placed on the inside of the tire. This strip 15 is preferably a partially cured mixture of rubber, sulfur, and finely divided mica or equivalent material. About the layers thus described are placed any suitable number of layers or wrappings of vulcanizable rubber and frictioned fabric, such as canvas, as indicated at 16, arranged in alternation. In Fig. 1, for the purpose of showing these various wrappings, they are illustrated as not being in close contact, but it will be understood that they will all be so wrapped and laid about the tire as to exclude air between them. Then about the outer or tread portion of the tire thus far completed, is placed a layer (crescent shape in cross-section) of vulcanizable rubber, as indicated at 17, so as to form the wearing surface of the tire. The tire, thus initially formed, is placed between two molds 18 18 which are forced by power together so as to compress the tire tightly around the mandrel, the two molds being then clamped or locked together so as to exert a constant pressure upon the tire. The mold is then placed in a heating oven or in a vulcanizing press where it is subjected to a vulcanizing temperature of say 250° to 285° F. As the heat is conducted gradually through the molds and into the tire toward the mandrel, the vulcanization apparently proceeds successively inwardly from the outer surface of the tire, the only portion remaining unvulcanized being the layer 12, the surfaces of which, however, become vulcanized to the adjacent layers 11 and 13.

In order that the article may be internally supported and the mandrel may be able to withstand the pressure as it grows soft, due to the heat, until the vulcanization is sufficiently completed as to be unaffected by the collapse of the mandrel, I may place in the interior of the mandrel or article a small amount of any suitable liquid which will vaporize or form an expansible gas under heat. In such case, I employ, for instance, a small amount of liquid ammonia or water, as for example, about seven ounces. The liquid serves to assist in preventing any adherence of the mandrel to the interior surface of the article, and to cause its easy removal after the vulcanization is completed. In some cases, inasmuch as the tire is subjected to great pressure in a vulcanizing press, the mandrel is filled with compressed air after it is placed in the molds and compressed, and the air serves to support the mandrel and the tire against said pressure. The compressed air, in conjunction with said gas or steam, in case the liquid be used, provides an increased pressure which compresses the rubber toward the molds. Thus, after the tire is placed in the mold, air is pumped in to a pressure of about seventy pounds per square inch. The tire being subjected to great pressure in a vulcanizing press, the press is heated with steam at forty to sixty-five pounds pressure. The rubber begins curing on the outside and heat radiates inward fusing the metal mandrel. When the mandrel becomes heated, before it has time to soften, the liquid therein, if ammonia, is converted into a gas, or if water, into steam which expands sufficiently to exert additional pressure against the mandrel and hold it in conjunction with the compressed air against the interior surface of the tire when the outer surface of the mandrel softens. When the heat is sufficiently intense, however, the mandrel becomes molten, and forms a pool in a portion of the interior of the tire. The expanding gas or steam in such case with the compressed air replaces the mandrel or core, as it were, and still further compresses the rubber toward the outside and exerts a sufficient pressure in conjunction with the compressed air against the inner walls of the tire to permit final vulcanization of the inner portions of the tire should such vulcanization not be completed before the mandrel becomes molten. From the foregoing, it will be seen that, for securing the internal pressure, I may utilize in conjunction with the fusible mandrel either the compressed air alone, or else the substance which will gasify, or both the compressed air and the gasifying substance.

In the initial construction of the tire, it will be understood that it is provided with a valve as ordinarily, as indicated at 19 in Fig. 4, and diametrically opposite said valve the tire is also provided with a sleeve or bushing 20 of brass or the like which is closed by a removable plug. When the tire is removed from the mold, a tube is introduced through the sleeve 20, and, although the pressure of the gas or steam in the tire will be sufficient to force out more or less of the molten material, which previously formed the mandrel, yet a pipe is preferably connected to the valve to force out the molten material by air or steam pressure. Should by any chance any of the metal adhere to the inner surface of the tire, it may be removed by a jet of hot water or steam, although such adherence is seldom on account of the use of the lubricant and the liquid, as previously described.

While the process has been set forth as carried out in the manufacture of tires in which the tire is subjected to great pressure in a vulcanizing press, it may be employed in the manufacture of other articles where a vulcanizing press is not used, and where any suitable form of hollow or skeleton core or shell is employed, the compressed air serving to sustain the necessary pressure within the rubber article as it is vulcanized in a mold.

Referring to Figs. 6 and 7, the present process may be employed in making seamless receptacles such as hot-water bags and the like. In such event, the core or mandrel is composed of three distinct parts, but instead of the main portion of the core being of solid fusible material, it may be in the shape of a frame or skeleton support for the receptacle, said frame or skeleton support being of fusible material. Any suitable form of frame or skeleton support serving as the main portion of the core or mandrel may be employed. As shown in Figs. 6 and 7, the main portion of the core or mandrel preferably consists of a frame or skeleton support 21, either solid or hollow as desired, and of a shape adapting it to support the rubber portions 22 and 37, forming the body of the receptacle, leaving a hollow space 24 between the sides of the receptacle and between the inner edges of the core. The main portion 21 of the core is provided with a socket to receive a tube 27 formed on the neck portion 26 of the core. The ring 25, although it initially forms a portion of the core or mandrel, is preferably made of some suitable material such as brass, that will permanently adhere to the rubber during the process of vulcanization, so that this ring subsequently forms a permanent rigid threaded portion of the bottle into which a stopper may be screwed. The neck portion 26 of the core or mandrel consists of ordinary iron or steel or other material which will not become fusible at a vulcanizing temperature, and it constitutes that portion of the mandrel which internally shapes the neck or mouth of the bottle. Thus the mandrel, before the article is vulcanized, consists of a fusible portion 21, a nonfusible portion 26, both of which are removed from the bag, and a nonfusible portion 25 which permanently adheres to the bag and becomes a part thereof. The fusible portion may be called the fusible skeleton core, and the portions 26 and 25 a supplemental core. On the end of the outlet pipe 28 may be threaded an outlet extension pipe 29 having a valve 30 so that air may be pumped into and compressed within the article about the core. The neck portion 26 is provided with a passageway 31 extending longitudinally through its center, and formed at its upper end with an enlarged screw-threaded portion adapted to receive the lower threaded end of the outlet pipe 28. In the neck portion 26 is a small duct 32 by which air is conducted to the hollow portion of the neck.

In manufacturing the hot-water bottle in connection with the core or mandrel just described, the vulcanizable rubber in the form of suitable blanks or strips is internally coated with the lubricant and assembled about the mandrel, so as to form the body portion, neck and mouth of the bag, after which the parts are all placed between the molds, as shown in Fig. 6. The molds are forced together under sufficient pressure so as to tightly compress the rubber about the mandrel. If desired, a small quantity of water or ammonia is introduced into the bag. Air is forced into the bag through the pipe 28, the neck 26 and the depending portion 27 until the desired internal pressure is secured. In actual practice I have employed either compressed air, or water, or both. The mold is placed in a vulcanizing oven, where it is subjected to a vulcanizing temperature of say 250° to 285° F. until vulcanization takes place. After the vulcanization is completed, the pressure in the article may be relieved before the article is removed from the molds by opening the valve 30.

In making up a hot-water bottle as described, two main strips 22 of vulcanizable rubber (see Fig. 11), coated on their inner faces with talc, are fitted over the fusible skeleton core, and the sections 33, 34, and 35 (shown in Figs. 12, 14 and 15) are assembled about the open ring and the non-fusible neck portion of the core pieces of rubber 36 (shown in Fig. 15) are assembled at the lower end of the bottle, and a longitudinal strip of rubber 37 is folded about the meeting edges of the main strip as shown. The various parts are overlapped as may be necessary, and the parts are placed in the molds for vulcanization. It is evident that the shapes of the rubber strips or pieces and the number thereof will change with the shape of the hollow article to be produced.

Having thus explained the nature of my said invention and described a way of constructing and using the same, although without attempting to set forth all of the forms in which it may be made or all of the modes of its use, what I claim is:—

1. The herein described process of making hollow rubber articles, which consists in forming the article of vulcanizable rubber about an initially rigid core or mandrel of material fusible at a temperature below that destructive to rubber, introducing into said article a substance capable of gasifying under heat, placing said article and core between molds, subjecting the molds to pressure, gasifying the said substance and vulcanizing the said article by heat, and removing the mandrel in fluid form.

2. In the manufacture of hollow, seamless, rubber articles, the following steps, to wit: forming the article of vulcanizable rubber about a hollow core or mandrel of material fusible at a temperature below that destructive to rubber, generating a pressure within said article, vulcanizing the article, and removing the core or mandrel in fluid form.

3. In the manufacture of hollow, seamless, rubber articles, the following steps, to wit: forming the article of vulcanizable rubber about a core or mandrel of material fusible at a temperature below that destructive to rubber, generating a pressure within said mandrel, vulcanizing the article, and removing the core or mandrel in fluid form by the generated pressure.

4. In the manufacture of hollow, seamless, rubber articles, the following steps, to wit: forming the article of vulcanizable rubber about a rigid core or mandrel of material fusible at a temperature below that destructive to rubber, introducing into said article a substance capable of gasifying under heat, vulcanizing said article and converting said substance into gas, and withdrawing the mandrel in fluid form.

5. In the manufacture of hollow, seamless, rubber articles, the following steps, to wit: providing a two-part rigid mandrel of which one part is made of a fusible material, shaping the article of vulcanizable rubber about said mandrel, vulcanizing said article, fusing the fusible part of said mandrel in the process of vulcanization, and withdrawing said mandrel in fluid form.

6. The herein described process of manufacturing seamless, hollow, rubber articles, consisting of forming the article of vulcanizable rubber about a core of fusible material, introducing into said article a substance which on the application of heat forms an expanding gas, vulcanizing said article, and sustaining the inner wall of said article during the vulcanization, first by said core and then by the expanding gas, and withdrawing said core in fluid form.

7. In the vulcanization of hollow rubber articles, the following step, to wit: during the vulcanization of the article, sustaining the inner wall of said article, first by a fusible core, and then when said core becomes molten by gas.

8. The herein described process of making hollow rubber articles, consisting in forming the article of vulcanizable rubber about a core, a portion of which is initially rigid, and of a material fusible at a temperature below that destructive to rubber, and a supplemental core formed of non-fusible material, vulcanizing the article, removing the non-fusible core and removing the fusible core in fluid form.

9. The herein described process of making hollow, seamless, rubber articles, which consists in forming the article of vulcanizable rubber about a sectional core, a portion of which is initially rigid and of a material fusible at a temperature below that destructive to rubber, another portion of which consists of a material that will vulcanize to rubber, and another portion of which consists of non-fusible material, vulcanizing the article, removing the non-fusible core, and removing the fusible core in fluid form.

10. In the manufacture of hollow, seamless, rubber articles, the following steps, to wit: forming the article of vulcanizable rubber about a sectional core having a main portion consisting of an initially rigid core of material fusible at a temperature below that destructive to rubber, a threaded ring of material which will vulcanize to rubber, and a core of a non-fusible material, subjecting said mandrel to pressure, vulcanizing the article, removing the non-fusible core, and removing the fusible core in fluid form.

11. In the manufacture of hollow, seamless, rubber articles, the following steps, to wit: forming the article of vulcanizable rubber about a hollow sectional core or mandrel, one part of which is fusible at a temperature below that destructive to rubber, one part of which vulcanizes to rubber, and one part of which is non-fusible, subjecting the article to pressure and vulcanizing it, removing the non-fusible core, retaining the vulcanizing core, and removing the fusible core in fluid form.

12. The herein described process of making hollow rubber articles, which consists in forming the article of vulcanizable rubber about an initially rigid skeleton core or mandrel of material fusible at a temperature below that destructive to rubber, filling said article with compressed air, vulcanizing the article, and removing the mandrel in fluid form.

13. The herein described process of making hollow rubber articles which consists in forming the article of vulcanizable rubber, having its inner face provided with a lubricant, about an initially rigid core or mandrel of material fusible at a temperature below that destructive to rubber, filling said article with compressed air, vulcanizing the article and removing the mandrel in fluid form.

14. In the manufacture of hollow, seamless, rubber articles, the following steps, to wit: forming the article of vulcanizable rubber about a hollow core or mandrel of material fusible at a temperature below that destructive to rubber, filling the article with compressed air, generating an additional pressure within said article from another source, vulcanizing the article, and removing the core or mandrel in fluid form.

15. In the manufacture of hollow, seamless, rubber articles, the following steps, to wit: forming the article of vulcanizable rubber about a core or mandrel of material fusible at a temperature below that destructive to rubber, filling the article with compressed air, generating an additional pressure within said article from another source, vulcanizing the article, and removing the core or mandrel in fluid form by the generated pressure.

16. In the manufacture of hollow, seamless, rubber articles, the following steps, to wit: forming the article of vulcanizable rubber about a rigid hollow core or mandrel of material fusible at a temperature below that destructive to rubber, introducing a liquid into said article, introducing compressed air into said article, vulcanizing said article, and withdrawing the mandrel in fluid form.

17. In the manufacture of hollow, seamless, rubber articles, the following steps, to wit: providing a rigid mandrel, shaping the article of vulcanizable rubber about said mandrel, filling said article formed on said mandrel with compressed air, vulcanizing said article, fusing said mandrel, and withdrawing said mandrel in fluid form.

18. The herein described process of manufacturing seamless, hollow, rubber articles, consisting of forming the article of vulcanizable rubber about a skeleton core of fusible material, introducing into said article a substance which on the application of heat forms an expanding gas, filling said article with compressed air, vulcanizing said article, and sustaining the inner wall of said article during the vulcanization, first by said core and said air pressure and increasing said pressure by the expanding gas, and withdrawing said core in fluid form.

19. In the vulcanization of hollow rubber articles, the following step, to wit: during the vulcanization of the article, sustaining the inner wall of said article by a fusible core and compressed air, and then increasing the internal pressure by an expanding gas.

In testimony whereof I have affixed my signature, in presence of two witnesses.

FREDERICK J. GLEASON.

Witnesses:
ALIR. T. BALDWIN,
EVERETT W. FURBUSH.